US009172182B2

(12) United States Patent
Toratani et al.

(10) Patent No.: US 9,172,182 B2
(45) Date of Patent: Oct. 27, 2015

(54) POWER SUPPLY CONNECTOR

(71) Applicant: FURUKAWA ELECTRIC CO., LTD., Chiyoda-ku, Tokyo (JP)

(72) Inventors: Tomoaki Toratani, Tokyo (JP); Naomi Takahashi, Tokyo (JP)

(73) Assignee: FURUKAWA ELECTRIC CO., LTD., Tokyo (JP)

( * ) Notice: Subject to any disclaimer, the term of this patent is extended or adjusted under 35 U.S.C. 154(b) by 0 days.

(21) Appl. No.: 14/292,958

(22) Filed: Jun. 2, 2014

(65) Prior Publication Data
US 2014/0273588 A1  Sep. 18, 2014

Related U.S. Application Data

(63) Continuation of application No. PCT/JP2012/072324, filed on Sep. 3, 2012.

(51) Int. Cl.
*H01R 13/627* (2006.01)
*H01R 13/635* (2006.01)
*H01R 13/639* (2006.01)

(52) U.S. Cl.
CPC ............ *H01R 13/627* (2013.01); *H01R 13/635* (2013.01); *H01R 13/639* (2013.01)

(58) Field of Classification Search
CPC .. H01R 13/639; H01R 13/6272; H01R 13/62; H01R 13/641
USPC .......... 439/345, 350–352, 157, 310–311, 372
See application file for complete search history.

(56) References Cited

U.S. PATENT DOCUMENTS

| 5,575,675 | A | * | 11/1996 | Endo et al. ..................... 439/310 |
| 5,873,737 | A | * | 2/1999 | Hashizawa et al. ............. 439/39 |
| 6,123,569 | A | * | 9/2000 | Fukushima et al. .......... 439/456 |
| 6,283,781 | B1 | * | 9/2001 | Mori ............................. 439/310 |
| 8,206,171 | B2 | * | 6/2012 | Osawa et al. ................ 439/352 |
| 8,500,476 | B2 | * | 8/2013 | Hori et al. .................... 439/310 |
| 2002/0177348 | A1 | * | 11/2002 | Karamatsu et al. ........... 439/352 |
| 2014/0045360 | A1 | * | 2/2014 | Toratani et al. .............. 439/345 |
| 2015/0011111 | A1 | * | 1/2015 | Toratani et al. .............. 439/357 |

FOREIGN PATENT DOCUMENTS

| EP | 2426791 A1 | 3/2012 |
| JP | 6188044 A | 7/1994 |

(Continued)

OTHER PUBLICATIONS

International Search Report for PCT/JP2012/072324 mailed Dec. 11, 2012.

*Primary Examiner* — Edwin A. Leon
(74) *Attorney, Agent, or Firm* — Hauptman Ham, LLP

(57) ABSTRACT

When the grasping member 3 is moved forward with respect to the case 9, the linkage 15a joint with the grasping member 3 is pushed in to the front. Because the linkage 15a moves forward, the arm rotates with the pin 23a as its axis of rotation. With the arm 13 rotating, the connector body 11 connected to the arm 13 via linkage 15b moves in the same direction as the grasping member 3. Note that because the coupling position of the grasping member 3 and the connector body 11 with respect to the arm 13 differ, the distance of movement of the grasping member 3 and the distance of movement of the connector body 11 with respect to the case 9 differ. That is, mechanisms such as the arm 13 etc. function as a deceleration mechanism.

7 Claims, 12 Drawing Sheets

(56) References Cited

FOREIGN PATENT DOCUMENTS

| JP | 9266025 | A | 10/1997 |
| JP | 2010282784 | A | 12/2010 |
| JP | 2012174643 | A | 9/2012 |
| WO | 2011081124 | A1 | 7/2011 |

* cited by examiner (a)

(b)

POWER SUPPLY CONNECTOR

RELATED APPLICATIONS

The present application is a continuation of Application Number PCT/JP2012/072324, filed Sep. 3, 2012 the disclosure of which application is hereby incorporated by reference herein in its entirety.

TECHNICAL FIELD

The present invention relates to a power supply connector for rapid charging, which is used in electric automobiles.

BACKGROUND ART

In recent years, from the view point of global environmental issues, electric automobiles that do not use fossil fuels are attracting attention. Electric automobiles are equipped with a battery for driving, and run on electricity charged in the battery.

For charging electric automobiles, there are methods of charging from regular domestic power sources and methods of rapid charging using special charging equipments. In a method that utilizes domestic power source, a special connector is unnecessary, but charging requires a long time, and thus, charging is done at night or in the hours when the automobile is not used. On the other hand, for continuous running of long distances, as with conventional refueling at gas stations, rapid charging at power supply spots provided at various places becomes necessary.

As a power supply connector for such electric automobiles, for example, a power supply connector, which comprises a case, a connector body that is slidably mounted to this case and accommodates multiple terminals, a pipe-shaped handle that is slidably mounted along the same axis with the connector body, and a lever, wherein the handle moves forward with the rotation of the lever, and fits the connector body to the connector body of the power reception side, is known (Patent Document 1).

PRIOR ART DOCUMENTS

[Patent Documents]
 [Patent Document 1] JP-A-H06-188044

SUMMARY OF THE INVENTION

Problem to be Solved by the Present Invention

Here, in connector connection for rapid charging, because a relatively large terminal must be inserted, the insertion resistance of the connector is large. As a solution, the connector of Patent Document 1 supports the connection resistance between the power supply connector and the power reception connector with a lever. However, it is difficult for the user to determine the timing at which the lever should be operated, and when the lever is operated while the distance and direction of the connectors are not at a certain state, the connectors could not be connected, and the operability of the connection was not necessarily good. Further, there was a problem in that the movement of the connector and the motion of the lever were instinctively difficult to comprehend for the operator.

FIG. 12 is a schematic figure of a conventional power supply connector 100. In the power supply connector 100, a connector body 101 is provided at the tip, which is connected to a power reception connector not shown in the figure. The operator performs the connector connection process while holding the handle in his hand 103. At this moment, due to interconnection resistance (such as insertion friction of multiple terminals) F1, the operator must push in with an equivalent force F2.

Further, in the power supply connector 100, because the handle 103 is not formed on the central axis of the connector body, a moment M1 occurs on the handle 103 with the force F1. For this reason, the operator must provide a force of moment M2 against it. That is, for the operator, comprehending the balance of force necessary for connecting the connector was difficult, and the connector operation process was intuitively difficult.

The present invention was made in view of such problems, and its object is to provide a power supply connector for electric automobiles that does not require strong force and enables operators to perform the connection process intuitively with ease.

Means for Solving the Problem

In order to achieve the above-described object, the present invention provides a power supply connector for automobiles, which comprises: a connector body; a case for accommodating the connector body; and a grasping member that is attached to the case; wherein the connector body and the grasping member are slidable in a direction of nearly the same axis line with respect to the case, and by moving the grasping member forward with respect to the case, the connector body is movable toward a forward position with respect to the case, along with the movement of the grasping member.

A locking means for maintaining connection with a power reception-side connector when connecting the power supply connector to the power reception-side connector is provided, and in the grasping member, a release mechanism for releasing the locking means may be provided.

The release mechanism may comprise a display part that enables distinguishing and visually recognizing a locked state and a released state of the power supply connector.

The grasping member may comprise a handle part, and part of the handle part is preferably arranged on a line extending from the central axis of the connector body.

It is preferable that the grasping member comprises a deceleration mechanism, and the movement of the grasping member and the connector body with respect to the case is performed via the deceleration mechanism; and when moving the grasping member with respect to the case, the distance of movement of the connector body with respect to the case is preferably smaller than the distance of movement of the grasping member with respect to the case.

The case may comprise an arm member; and in the deceleration mechanism, the end vicinity of the arm member is rotatably provided on the case, the other end vicinity of the arm member is rotatably connected to the grasping member, and the connector body is rotatably connected to a part of the arm member between the connection part with the case and the connection part with the grasping member, and when the grasping member is moved with respect to the case, the arm member rotates with the connection part with the case serving as its center, and the connector body may move with respect to the case along with the rotation of the arm member.

In the case, a first gear and a second gear with less numbers of teeth than the first gear are provided; and in the deceleration mechanism, the first gear and second gear are rotatably provided on the case; the grasping member is connected to the first gear via a first coupling member and a linear-direction movement of the grasping member is converted to a rotational-direction movement of the first gear; the connector body is connected to the second gear via a second coupling member, and the rotational-direction movement of the second gear is converted to the linear-direction movement of the connector body; and when the grasping member is moved with respect to the case, the first gear rotates, the rotation is transmitted to the second gear, and the connector body may move with respect to the case along with the rotation of the second gear.

In the connector body, a pulley is provided; and in the deceleration mechanism, one end of a belt hung on the pulley is fixed to the case; the other end of the belt is connected to the grasping member; and when the grasping member is moved with respect to the case, the pulley is moved with respect to the case via the belt, and the connector body may move with respect to the case.

The grasping member may be slidable with respect to the case via a parallel link.

According to the present invention, when the grasping member is pushed in with respect to the case, the connector body moves in the same direction. Thus, the operator can easily comprehend the movement of the connector body, and can easily grasp the sense of the operation. Therefore, excellent operability of the connection process for connecting the power supply connector and the power reception connector is obtained.

Further, by providing a locking mechanism that maintains the locked state between the power supply connector and the power reception connector while the power supply connector and the power reception connector are connected, the power supply connector cannot be loosened even when the cable etc. is accidentally pulled. Further, the locking mechanism can easily be released by the release mechanism, and thus, excellent operability is obtained.

Further, the locked state and the released state of the locking mechanism can easily be visually recognized. Thus, the operator can easily comprehend the connective state of the power supply connector and the power reception connector.

Moreover, the handle part, which becomes the grip when the operator handles the power supply connector, is provided on the central axis of the connector body. Thus, the occurrence of the aforementioned moment can be suppressed when the connector is connected, and excellent operability is attained.

Furthermore, a deceleration mechanism is provided within the power supply connector. By making the distance of movement of the connector body small relative to the distance of movement of the grasping member, the grasping member can be moved with a smaller force than the resistance the connector body receives when connecting to the power reception connector. Thus, the connection process can be performed with less force.

Note that as the deceleration mechanism, an arm member may be provided to use the principle of leverage, or a gear or pulley may be used. As long as the force necessary for pushing in the grasping member is smaller than the connection resistance that the connector body receives, any means may be applied.

Further, if the sliding of the grasping member and the case is performed using a parallel link, rattling between the grasping member and the case can be suppressed.

Effect of the Invention

According to the present invention, a power supply connector for electric automobiles that does not require strong force and enables intuitive connection operation for the operator can be provided.

BEST MODE FOR CARRYING OUT THE INVENTION

Figure 1:
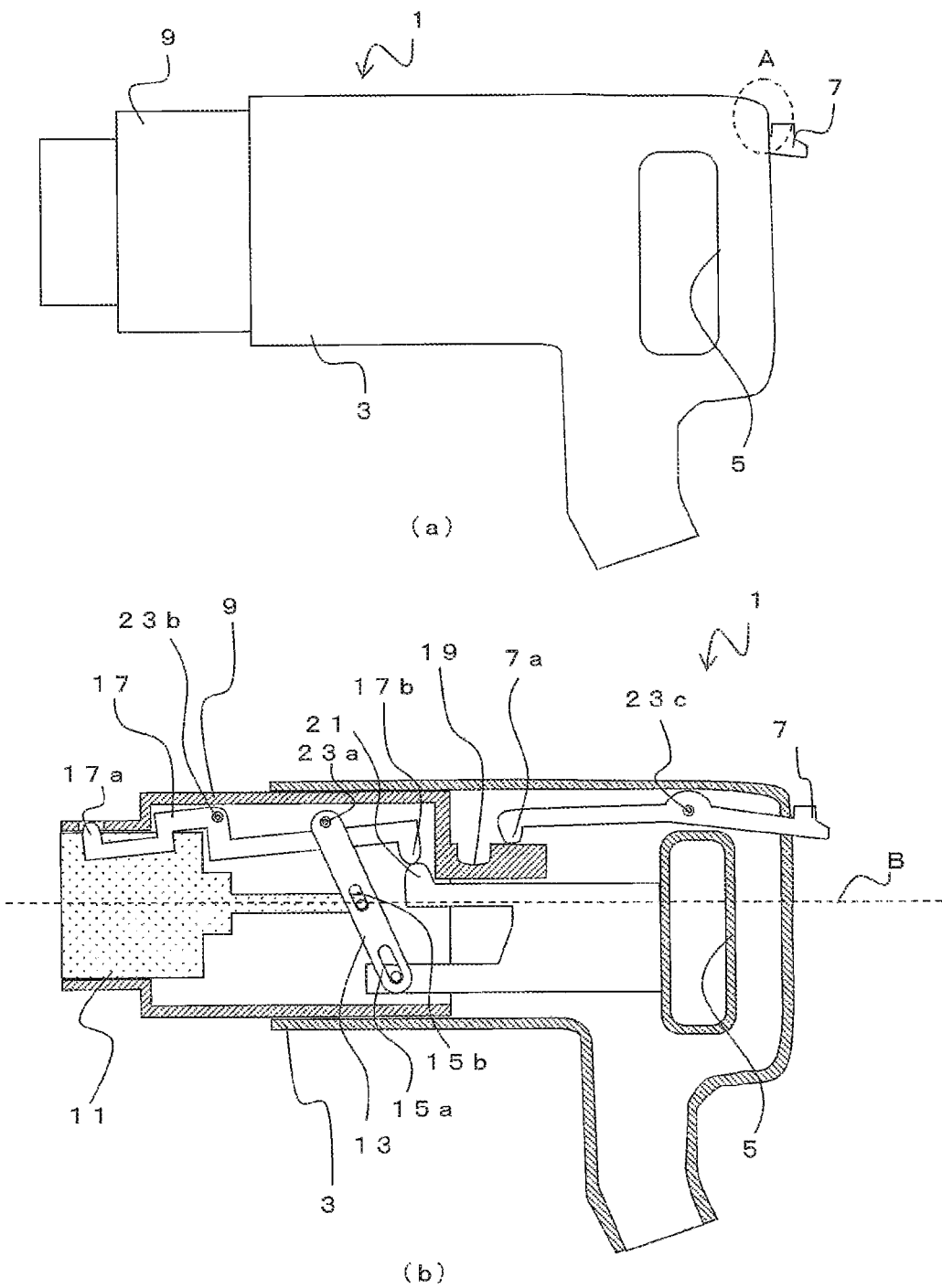
FIG. 1 is a figure that shows the power supply connector 1, and (a) is a side view, and (b) is a sectional side view.

Hereinafter, embodiments of the present invention will be described with reference to the accompanying figures. FIG. 1 is a schematic diagram that indicates the power supply connector 1, and FIG. 1(a) is a side view, and FIG. 1(b) is a sectional side view. Note that in the present invention, the state shown in FIG. 1 is referred to as the normal state. Further, in the following figures, cables and such are abbreviated from the figure. The power supply connector 1 mainly comprises a grasping member 3, a case 9 and a connector body 11.

As shown in FIG. 1(a) and FIG. 1(b), the grasping member 3 comprises a handle 5 on one end (rear). The handle 5 is the part that is held by the operator when handling the power supply connector 1. Here, the handle 5 is formed so that at least part of the handle 5 is positioned on a line that extends from the central axis of the connector body 11 (line B in FIG. 1(b), which is the axis of the movement direction of the later-described connector body). The interior of the grasping member 3 can accommodate various structures. A case 9 is provided on the other end (front) of the grasping member 3. The vicinity of the front end of the grasping member 3 is cylindrical, and part (rear end) of the case 9 is accommodated within the grasping member 3. The grasping member 3 can slide back and forth with respect to the case 9.

The case 9 is a cylindrical member and the connector body 11 is accommodated in the front end of the case 9. The connector body 11 can slide back and forth with respect to the case 9. Note that each slidable part of the grasping member 3 and the connector body 11, with respect to the case 9, may contain guide mechanisms and stoppers that regulate the slidable area, which are abbreviated from the figure.

Inside the case 9 is provided an arm 13. The vicinity of one end of the arm 13 is rotatably attached to the case 9 with a pin 23a. The vicinity of the other end of the arm 13 is connected to part of the grasping member 3 (a connection bar, which is joined to the grasping member 3), at a linkage 15a. At the linkage 15a, both parts are rotatably connected by an elongated hole formed on the arm 13 and a pin etc. formed on the grasping member side.

The arm 13 is connected to the connector body 11 by the linkage 15b substantially at the center (between pin 23a and linkage 15b). The structure of linkage 15b is similar to that of linkage 15a. That is, when the arm 13 rotates, the connector body 11 and the grasping member 3 are movable on a straight line with respect to the case 9, along with the rotation of the arm 13.

In the case 9 is provided a locking member 17. The locking member 17 is rotatably attached to the case 9 by a pin 23b. A lock pin 17a is formed in an upward direction at the front end of the locking member 17. The lock pin 17a is arranged at the position of an opening formed on the case 9.

At the rear end of the locking member 17 is provided a joint 17b in a downward direction. Joint 17b is in a convex shape that can fit joint 21. Joint 21 is fixed on the grasping member 3. In a normal state, the joints 17b and 21 do not fit and the protrusion of joint 17b is positioned on top of the protrusion of joint 21. Further, in this state, because joint 17b is pushed up by joint 21 in an upward direction, the lock pin 17a does not protrude from the case 9 (the opening formed on the case 9) via pin 23b and remains within the case 9.

An operation part 7 is provided within the grasping member 3. The operation part 7 is rotatably attached to the grasping member 3 by a pin 23c. The rear side end of the operation part 7 protrudes out from the grasping member 3, allowing the operator to operate the operation part 7 from the outside. A lock pin 7a is provided at the front of the operation part 7 in a downward direction. The lock pin 7a comes in contact with part of the case 9, and is normally in a state of being pushed up. On the case 9 at the front side of the part that comes in contact with the lock pin 7a in a normal state, a concaved part 19, to which the lock pin 7a can fit into, is provided.

Figure 2:
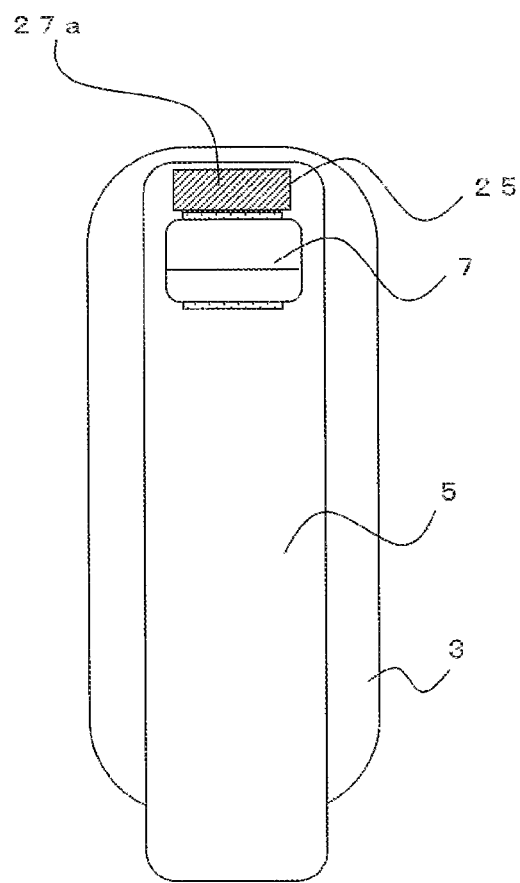
FIG. 2 is an enlarged rear view of part A in FIG. 1(b).

FIG. 2 is an enlarged rear view of part A in FIG. 1. A display part 25 is formed at the top of the handle 5. A mark 27a is provided at the display part 25. In a normal state as shown in FIG. 1, the lock pin 7a side of the operation part 7 is pushed up. Thus, the operation part 7 is in a state of being rotated towards the right hand direction in the figure with pin 23c serving as the axis. Here, the end of the operation part 7 is positioned at the bottom of the display part 25. Thus, the mark 27a can be visually recognized from the display part 25.

Figure 3:
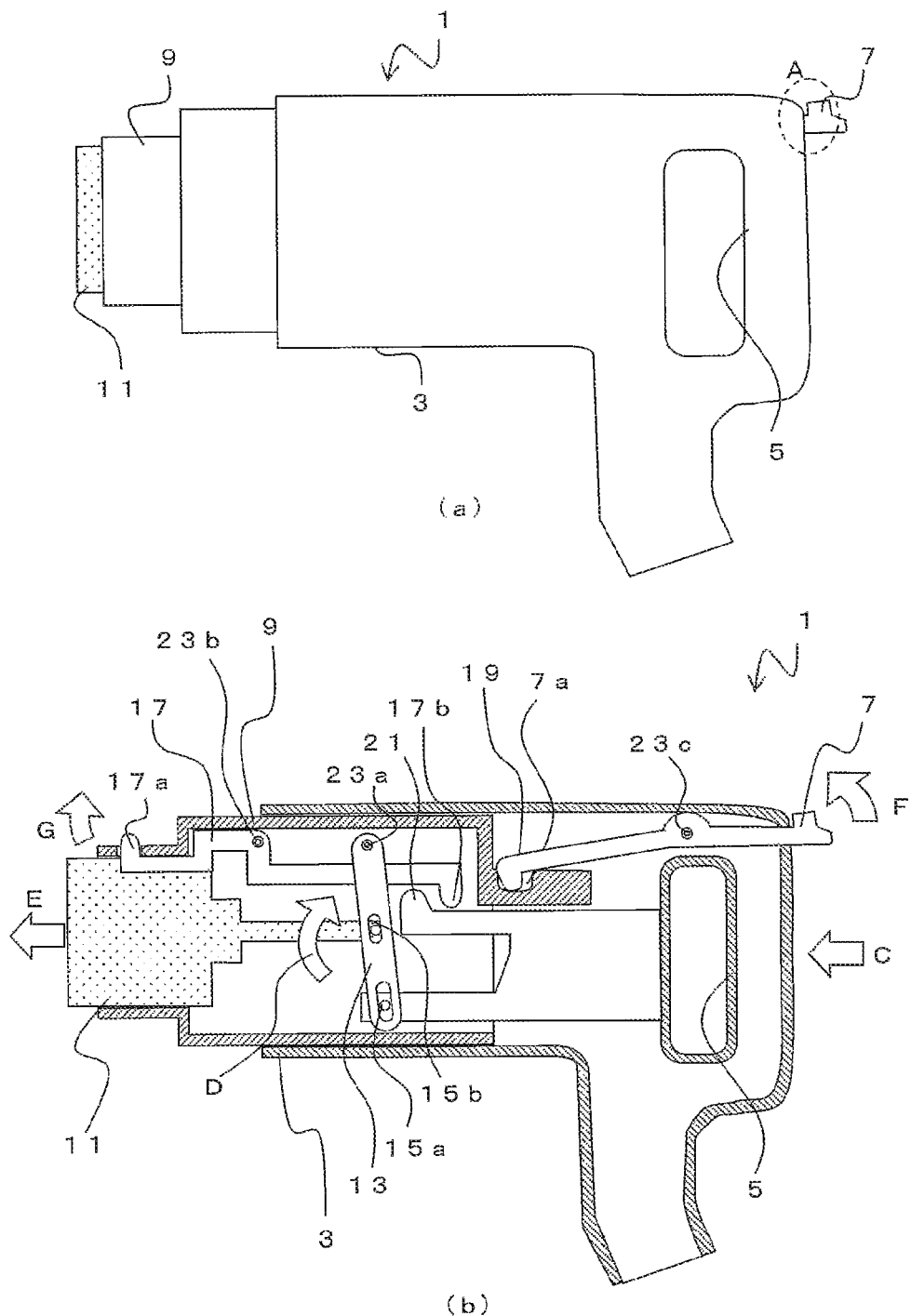
FIG. 3 is a figure that shows the power supply connector 1 at a state of operation and (a) is a side view, and (b) is a sectional side view.

Next, a state in which the power supply connector 1 is operated will be described. FIG. 3 is a figure that shows the power supply connector 1 in a state where the grasping member is moved, and FIG. 3(a) is a side view, and FIG. 3(b) is a sectional side view.

As shown in FIG. 3(b), when the grasping member 3 is moved forward with respect to the case 9 (in the direction of arrow C in the figure), the linkage 15a, which is joint to the grasping member 3, is pushed in toward the front. Because the linkage 15a moves forward, the arm 13 rotates toward the right hand direction in the figure (in the direction of arrow D in the figure) with the pin 23a serving as its axis of rotation. The connector body 11, which is connected to the arm 13 with the linkage 15b, moves toward the same direction as the grasping member 3 (in the direction of arrow E in the figure), due to the rotation of the arm 13.

Note that the distance of movement for the grasping member 3 and the distance of movement for the connector body 11 with respect to the case 9 differ, because the coupling positions with respect to the arm 13 differ for the grasping member 3 and the connector body 11. Specifically, when the ratio of the distance of the linkages 15a and 15b from the pin 23a is 2:1, then if the distance of movement of the grasping member 3 with respect to the case 9 is set as 2, the distance of movement of the connector body 11 becomes 1. That is, the mechanism of the arm 13 etc., functions as a deceleration mechanism.

Further, because the grasping member 3 moves forward with respect to the case 9, joint 17b and joint 21 join together to fit. Thus, the locking member 17 rotates with the pin 23b serving as its axis of rotation. That is, the locking member 17 rotates because the joint 17b side is pushed downward, and the lock pin 17a on the other end is pushed upward. Thus, the lock pin 17a protrudes outward (in the direction of arrow G in the figure) from the case 9 through the opening. Note that the locking member 17 may be formed with a spring etc., so that it constantly tries to return to the state shown in FIG. 3 (a state wherein the joint 17b is pushed down).

Further, because the grasping member 3 moves forward with respect to the case 9, the lock pin 7a of the operation part 7 moves toward the concaved part 19 and the lock pin 7a fits into the concaved part 19. Thus, the operation part 7 rotates with the pin 23c serving as its axis of rotation. That is, due to the lock pin 7a being push downward, the operation part 7 rotates and the other end is pushed upward (in the direction of arrow F in the figure). Note that the operation part 7 may be formed with a spring etc., so that it constantly tries to return to the state shown in FIG. 3 (a state wherein the lock pin 7a is pushed down).

When the lock pin 7a fits into the concaved part 19, the movement of the grasping member 3 with respect to the case 9 is locked. That is, the operation part 7 functions as a locking means for locking the movement of the grasping member (and the connector body 11) with respect to the case 9, and by operating the operation part 7 (pushing down the outside end of the operation part 7), it functions as a release mechanism for releasing said lock.

Figure 4:
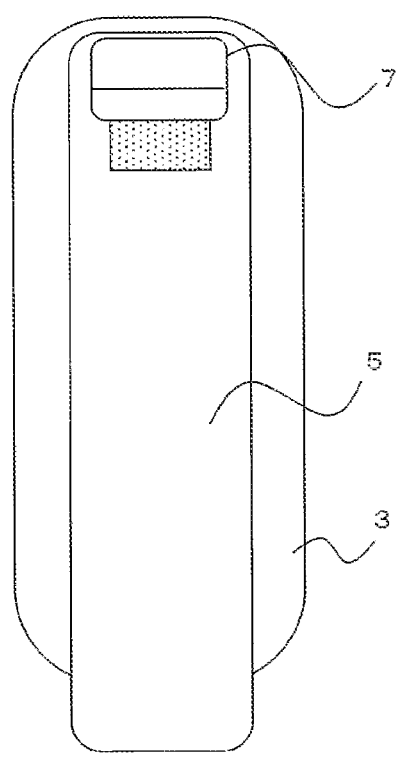
FIG. 4 is an enlarged rear view of part A in FIG. 3(b).

FIG. 4 is an enlarged rear view of part A in FIG. 3, and corresponds to FIG. 2. In the state shown in FIG. 3, the operation part 7 is in a state in which the lock pin 7a side is pushed downward. Thus, the operation part 7 is in a state of being rotated toward the left hand direction in the figure with the pin 23c serving as the axis of rotation. Here, the end of the operation part 7 is positioned so that it covers the display part 25. Thus, the mark 27a in the display part 25 becomes visually unrecognizable.

That is, by confirming the presence or absence of the mark 27a in the display part 25, the state of the operation part 7 can be visually recognized. That is, by providing the operation part 7, whether the power supply connector 1 is in a locked state (the state of FIG. 3) or in a released state can easily be observed. Note that the method of visual recognition of the state of the operation part 7, the arrangement of the display part, the mark, etc. are not limited to those exemplified in the figure, and may be any method as long as the locked state and the released state of the operation part 7 can be visually recognized.

Figure 5:
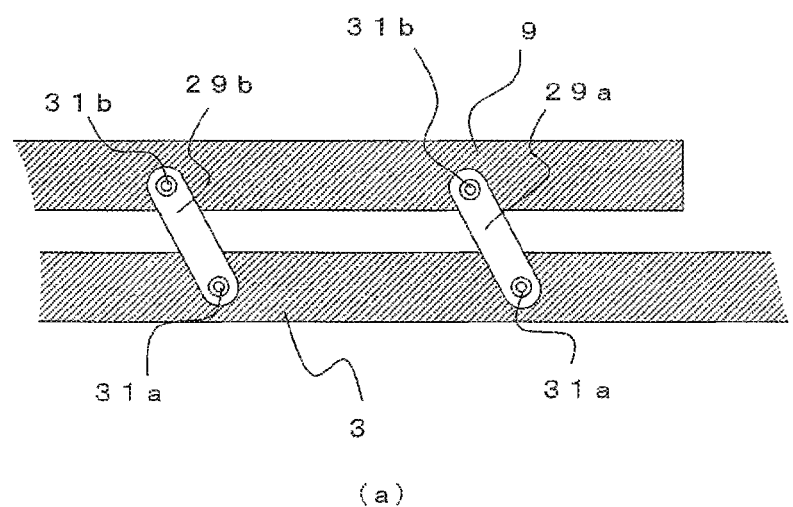
FIG. 5 is a figure that shows the connection structure of the grasping member and the case.
Figure 5:
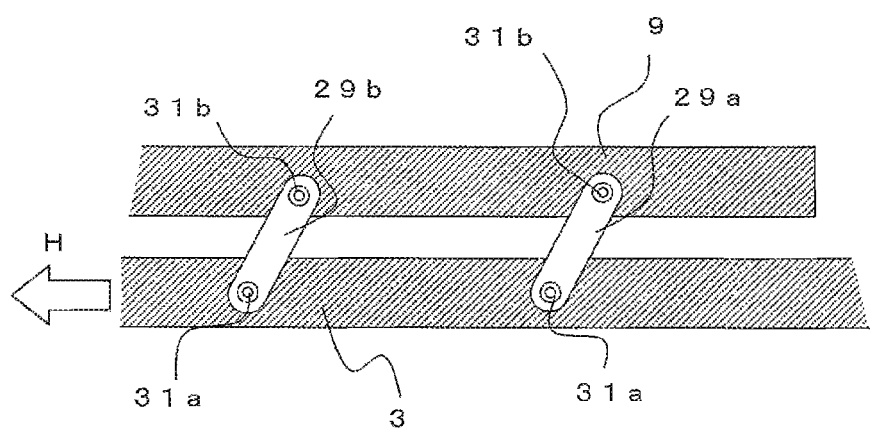

Further, a parallel link may be used as the sliding part of the grasping member 3 (or the connector body 11) and the case 9. FIG. 5 is an enlarged view of the vicinity of the sliding part of the grasping member 3 and the case 9, and FIG. 5(a) shows a state in which the grasping member 3 is moved backward with respect to the case 9 (the state shown in FIG. 1, which is the normal state), and FIG. 5(b) shows a state in which the grasping member is moved forward with respect to the case 9 (the state shown in FIG. 3).

As shown in FIG. 5, multiple numbers of links 29a, 29b are arranged in an almost-parallel position, and the vicinity of both ends are rotatably connected to the grasping member 3 and the case 9 via pins 31a and 31b. When the grasping member 3 is moved with respect to the case 9, links 29a, 29b each rotate with pins 31a and 31b serving as the axis of rotation, and both move relative to each other (the grasping member 3 moves forward (in the direction of arrow H in the figure) with respect to the case 9). By using such a parallel link, rattling of the grasping member 3 (or the connector body 11) and the case 9 during sliding is less likely to occur, and the range of movement can be regulated.

Figure 6:
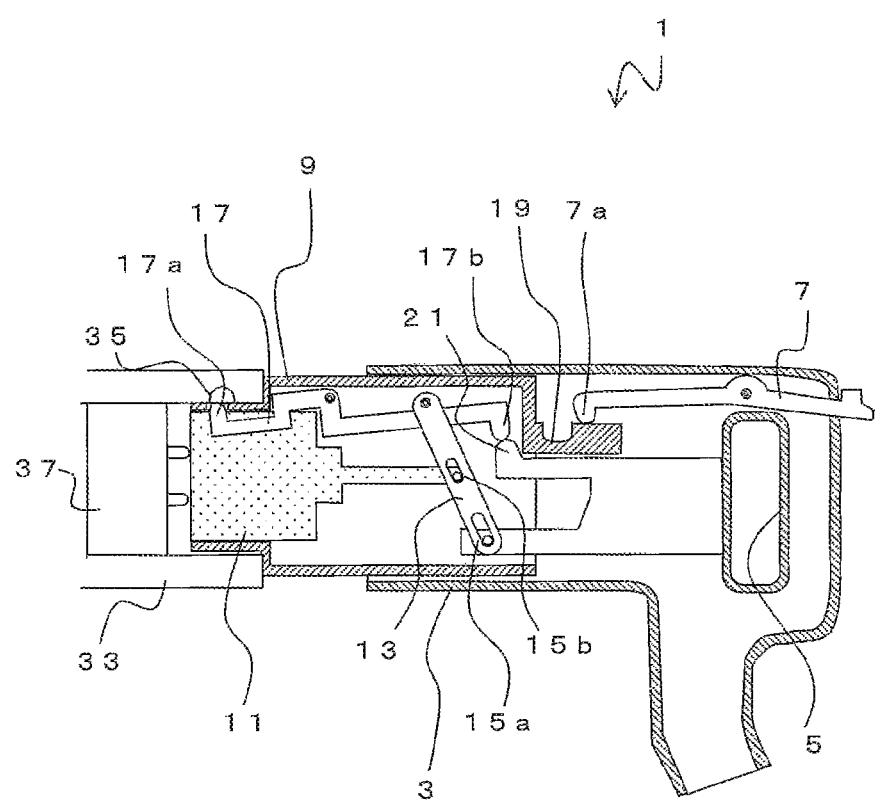
FIG. 6 is a figure that shows a state in which the power supply connector 1 is being connected to the power reception connector 33.

Next, the method of utilizing the power supply connector 1 will be described. First, as shown in FIG. 6, the power supply connector 1 in a normal state is faced toward the power reception connector 33. Specifically, the tip of the case 9 is inserted into the concaved part of the power reception connector side. Note that a connector body 37 is accommodated within the power reception connector 33. In this state, the male-female terminals of the connector bodies 11 and 37 are arranged with a slight gap and are not in a connected state.

Note that in a state in which the case is arranged in the power reception connector 33 side, a concaved part 35 is formed at a position corresponding to the lock pin 17a, within the power reception connector 33 side. To align the position of the lock pin 17a and the concaved part 35, or to align the position of the aforementioned male-female terminals, a guide etc. may be formed on the outer surface of the case 9 for determining the position in relation to the power reception connector.

Figure 7:
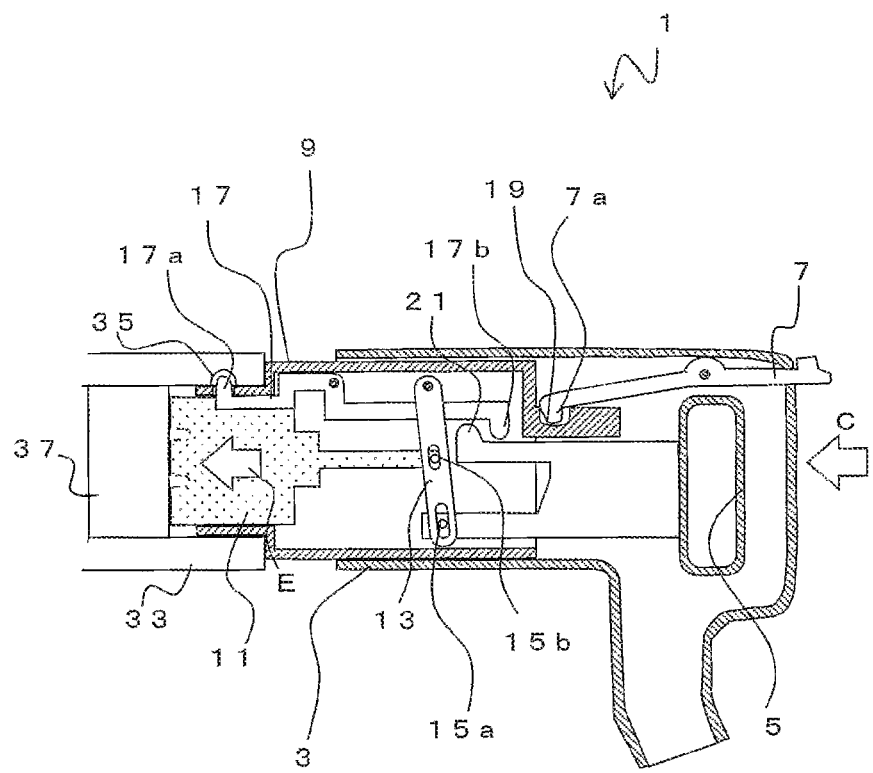
FIG. 7 is a figure that shows a state in which the power supply connector 1 is connected to the power reception connector 33.

Next, as shown in FIG. 7, the grasping member of the power supply connector 1 is pushed into the power reception connector 33 side (in the direction of arrow C in the figure). Here, the case comes in contact with the power reception connector 33, becomes fixed, and cannot be pushed in any further. For this reason, as described previously, by moving the grasping member 3 forward with respect to the case 9, the connector body 11 moves forward with respect to the case 9 (in the direction of arrow E in the figure). Thus, the connector body 11 protrudes from the front of the case 9, and is connected with the connector body 37 of the power reception connector side.

At this moment, when the ratio of the distance of movement of the grasping member 3 and the connector body 11 with respect to the case 9 is 2:1, by pushing the grasping member in a movement distance that is twice the spare length of connection, which connects the connector body 11 and the connector body 37, the connector body 11 can be moved just enough to allow the connectors to connect. That is, the connectors can be connected by pushing in the grasping member 3 with half the force necessary for connecting the two connectors (i.e., interconnection resistance). Note that the deceleration ratio of the deceleration mechanism can be set arbitrarily, taking into consideration the interconnection resistance and operability.

Further, in the state shown in FIG. 7, as described previously, the lock pin 17a fits into the concaved part 35. For this reason, the power reception connector 33 and the power supply connector 1 are locked in a connected state. Further, the lock pin 7a at the end of the operation part 7 fits into the concaved part 19. For this reason, the movement of the grasping member 3, with respect to the case, becomes locked. Thus, even when the cable etc., which is abbreviated in the figure, is pulled, the power supply connector 1 is not easily disconnected from the power reception connector 33.

Note that when disconnecting the power supply connector 1, by pressing down the end of the operation part 7, the lock pin 7a can be pushed up. By pulling back the grasping member 3 in this state, joint 17b moves above joint 21, which leads the lock by the lock pin 17a to be released. Thus, the power supply connector 1 can easily be disconnected.

As described above, by using the power supply connector 1 of the present embodiment, connection with the power reception connector can easily be performed without the use of strong force. In particular, because the pushing movement of the grasping member by the operator matches the direction of connection of the connector body 11, by using the power supply connector 1, the operator can easily comprehend the connection process intuitively.

Further, because a locking means for locking the connection between the power supply connector 1 and the power reception connector 33 and an operation part 7, which is a release mechanism for releasing this lock, are formed, the connected state of the connector can be maintained with certainty, and can easily be released. Moreover, the locked state and the released state can easily be confirmed. Thus, excellent operability is attained.

Furthermore, because part of the handle 5 is formed on a line extending from the central axis of the connector body, when the grasping member is pushed in, the moment that accompanies the counterforce from the connection resistance between the connectors can be suppressed. Thus, the power supply connector shows excellent operability.

Further, by providing a deceleration mechanism against the movement of the grasping member 3 and the connector body 11 with respect to the case 9, the amount of force necessary for connecting the connectors can be reduced. Further, by performing the sliding between the grasping member 3 and the case 9 with a parallel link, chattering between the grasping member 3 and the case 9 can be reduced.

Figure 8:
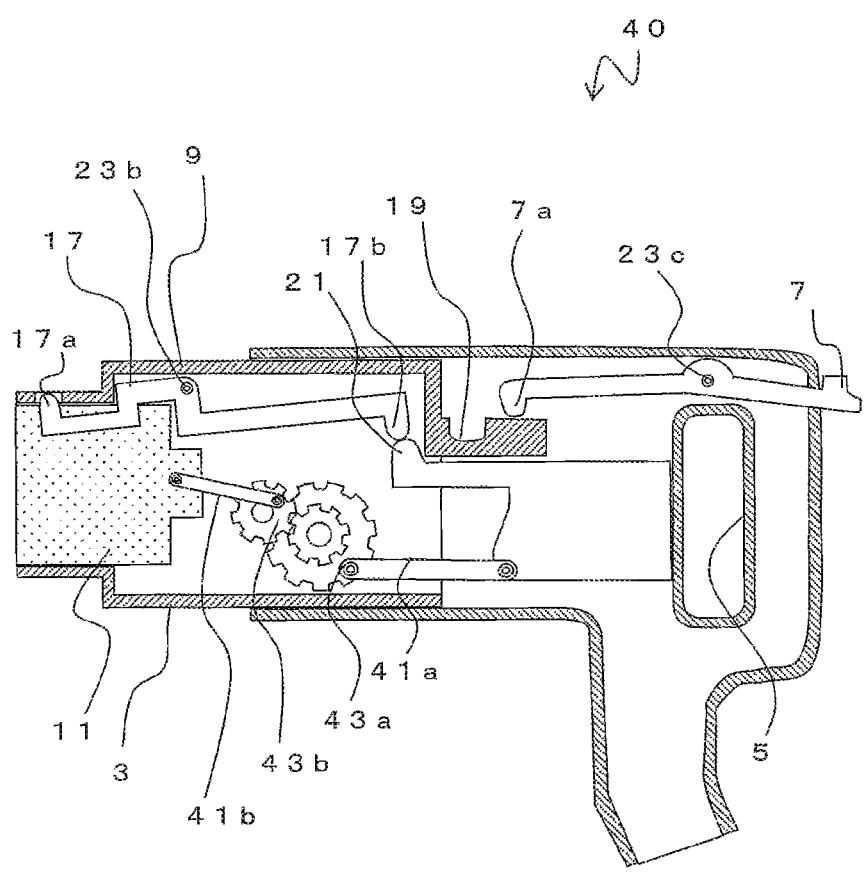
FIG. 8 is a sectional side view of the power supply connector 40.
Figure 9:
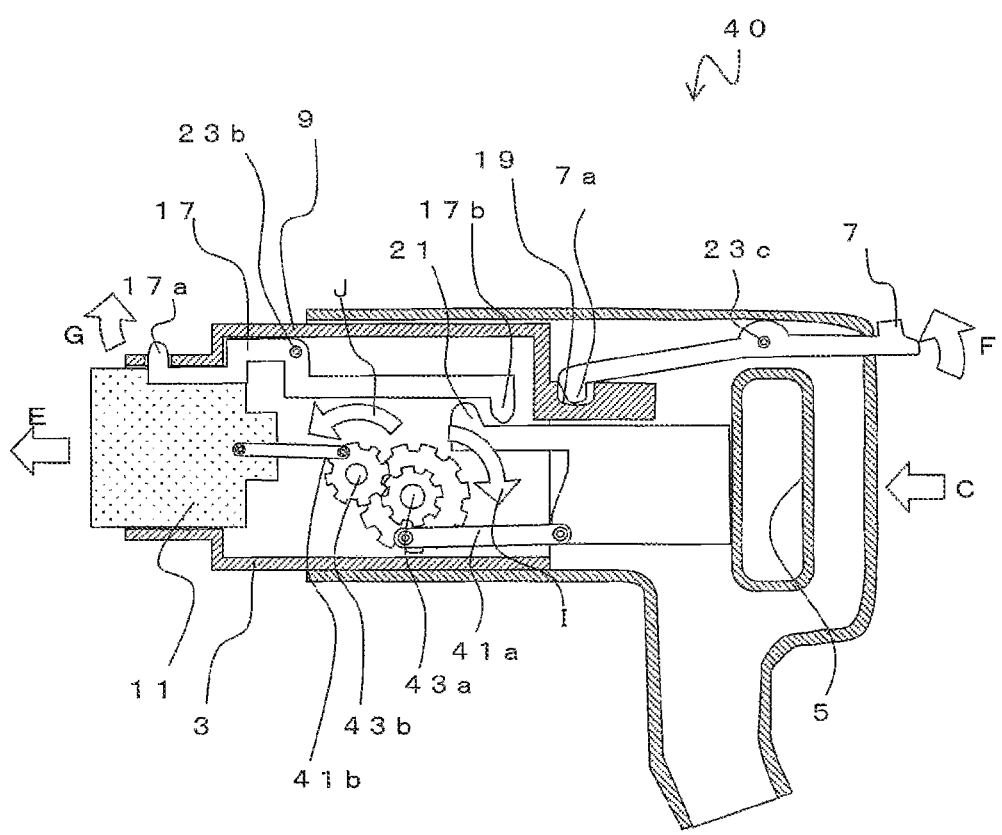
FIG. 9 is a sectional side view of the power supply connector 40 at a state of operation.

Next, another embodiment will be described. FIG. 8 and FIG. 9 are diagrams of another embodiment of the power supply connector 40. FIG. 8 is a sectional side-view of the normal state, and FIG. 9 is a sectional side-view of a state in which the grasping member 3 is moved. Note that in the following embodiment, for those components that show the same functions as those of power supply connector 1, the same notations are given and redundant descriptions will be abbreviated.

Power supply connector 40 has almost the same composition as that of power supply connector 1, but the deceleration mechanism is different. That is, power supply connector 40 comprises gears 43a, 43b and coupling members 41a, 41b etc. as the deceleration mechanism.

As shown in FIG. 8, gear 43a consists of a large gear and a small gear jointed together on one axis. Further, the small gear of gear 43a and gear 43b are rotatably fixed to the case 9 in a state wherein their teeth bite each other. Note that in gear 43a, the large gear has, for example, a diameter that is twice as large (twice as many teeth) than the small gear. Further, gear 43b is similar to the small gear of gear 43a.

At a position displaced from the center of the large gear of gear 43a, one end of coupling member 41a is coupled. The coupling member 41a is rotatably attached to gear 43a with a pin etc. The other end of coupling member 41a is rotatably coupled to part of the grasping member 3.

Similarly, at a position displaced from the center of gear 43b (for example, at a position of ½ the displacement distance from the center of gear 43a to the coupled position of coupling member 41a), one end of coupling member 41b is coupled. The coupling member 41b is rotatably attached to gear 43b with a pin etc. The other end of coupling member 41b is rotatably coupled to the connector body 11.

As shown in FIG. 9, when the grasping member 3 is moved from the state shown in FIG. 8 (in the direction of arrow C shown in the figure), the grasping member 3 moves forward, with respect to the case 9. At this moment, coupling member 41a, which is connected to the grasping member 3, is pushed forward. Thus, the movement of the coupling member 41a is converted to the rotational-direction motion of gear 43a (in the direction of arrow I in the figure).

When gear 43a rotates, the rotation is transmitted to gear 43b, which bites with gear 43a (in the direction of arrow J in the figure). With the rotation of gear 43b, the rotational motion of 43b is converted to a motion that moves coupling member 41b in a forward direction. Thus, the connector body 11 is pushed forward by coupling member 41b (in the direction of arrow E in the figure).

Note that motions of other lock pins etc. are similar to those in power supply connector 1. Further, by setting the number of teeth in gears 43a and 43b (as well as the coupled position of the gear and the coupling member), the ratio between the distance of movement of the grasping member 3 and the distance of movement of the connector body 11 can arbitrarily be set.

According to power supply connector 40, the same effects as those of power supply connector 1 can be obtained. That is, connection with the power reception connector can easily be performed without strong force.

Figure 10:
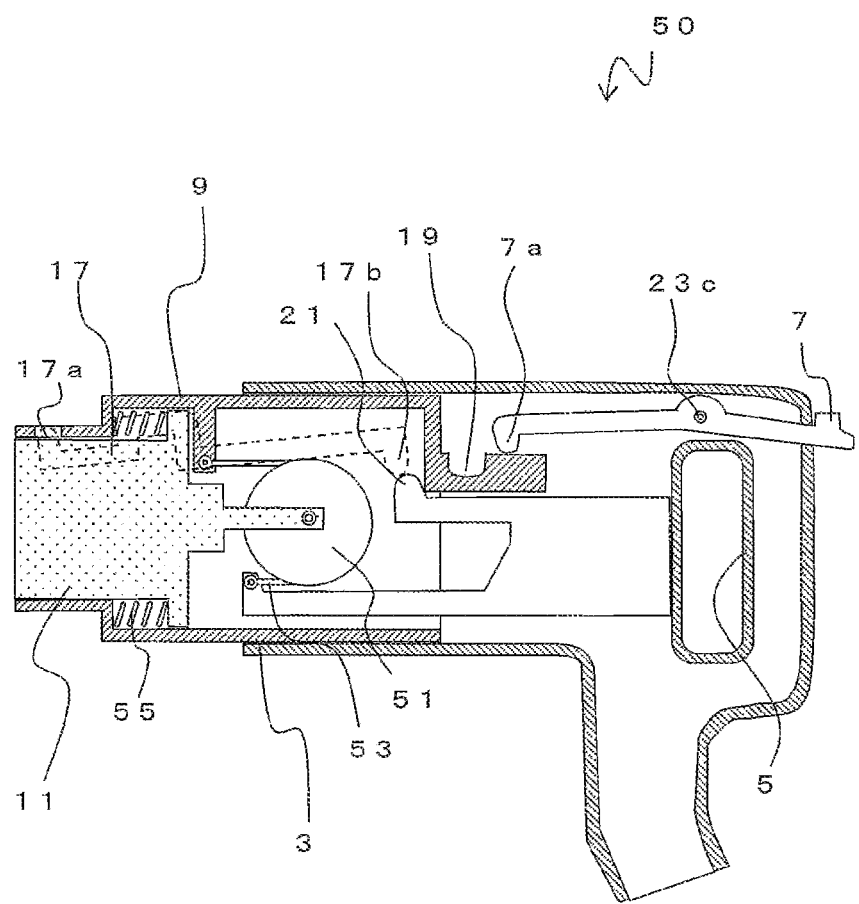
FIG. 10 is a sectional side view of the power supply connector 50.
Figure 11:
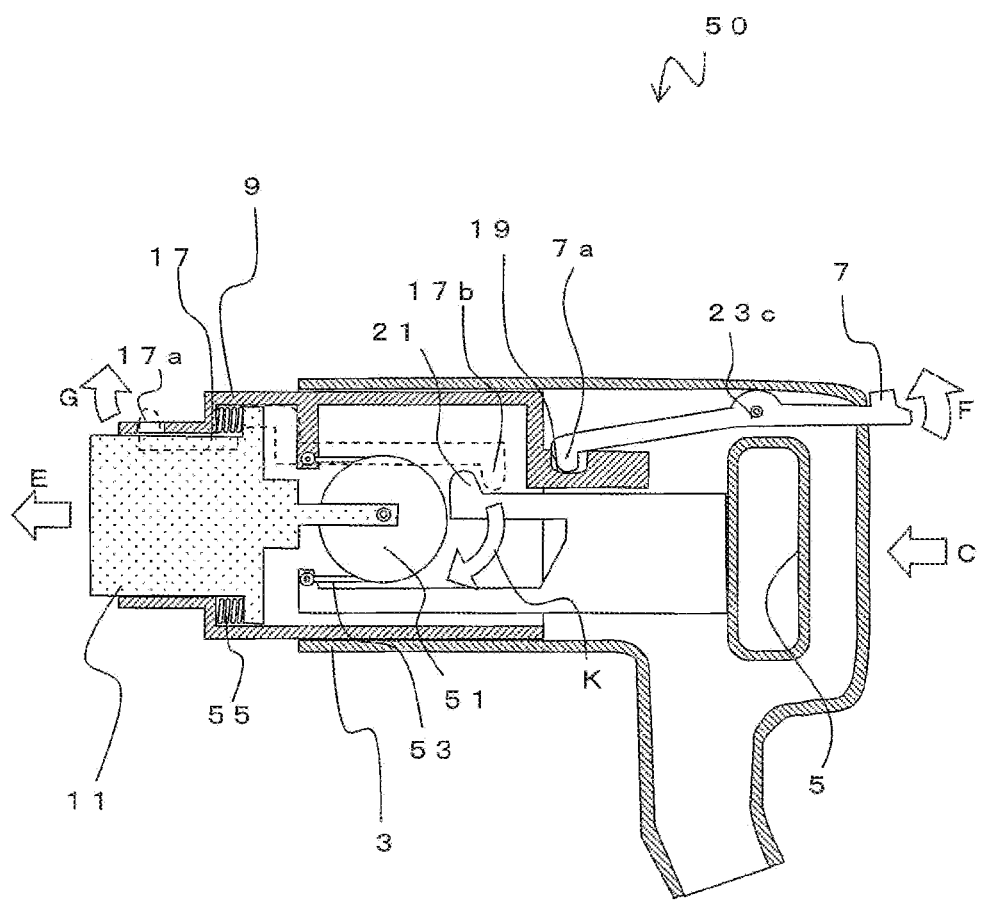
FIG. 11 is a sectional side view of the power supply connector 50 at a state of operation.
Figure 12:
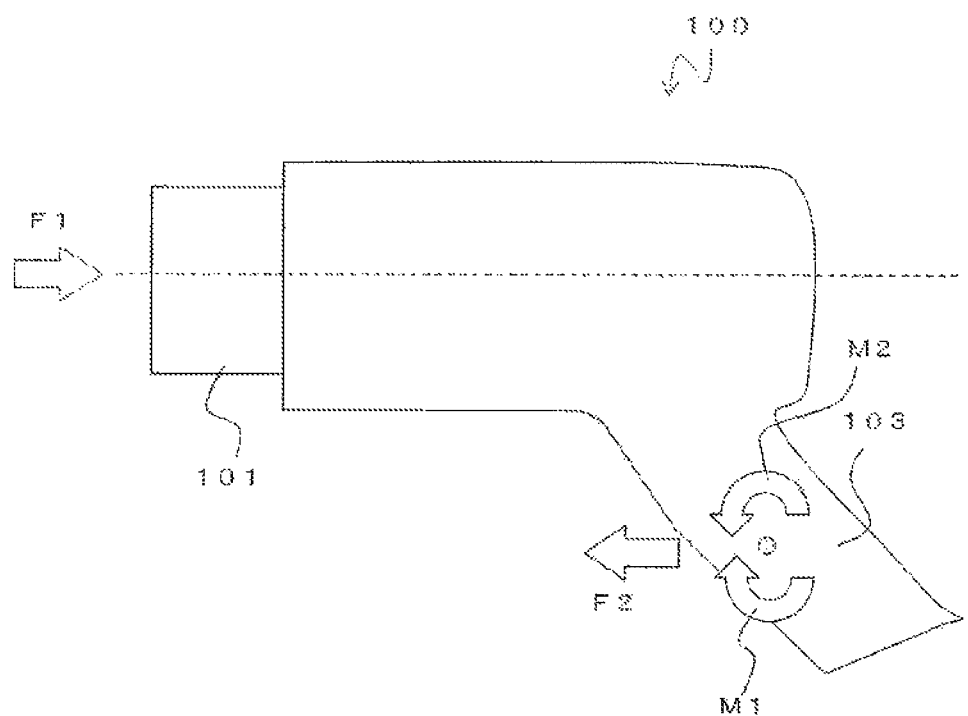
FIG. 12 is a figure showing a conventional power supply connector 100.

FIG. 10 and FIG. 11 are diagrams of yet another embodiment of the power supply connector 50, and FIG. 10 is a sectional side-view of the normal state and FIG. 11 is a sectional side-view of a state in which the grasping member 3 is moved. The power supply connector 50 has almost the same composition as that of power supply connector 1, but the deceleration mechanism is different. That is, the power supply connector 50 comprises a pulley 51 and a belt 53 etc. as the deceleration mechanism, instead of compositions such as the arm 13 etc.

As shown in FIG. 10, a pulley 51 is attached to the backside of the connector body 11. A belt 53 is hung on the pulley 51. One end of the belt 53 is fixed to the case 9. The other end of the belt 53 is connected to part of the grasping member 3 (the connection bar adjoining the grasping member 3). That is, the belt 53 is hung on the back side of the pulley 51 with both ends facing toward the front of the connector.

A spring 55 is provided between the connector body 11 and the case 9. The spring 55 pushes back the connector body 11 against the case 9. That is, in a normal state, the connector body 11 is pushed into the interior of the case 9. Thus, in a normal state, the pulley 51 is in a state of being moved backward with respect to the case 9.

As shown in FIG. 11, when the grasping member 3 is moved from the state shown in FIG. 10 (in the direction of arrow C shown in the figure), the grasping member 3 moves forward, with respect to the case 9. At this moment, the end of the belt 53 (the part connected to the grasping member 3) is pulled forward. Because the other end of the belt 53 is fixed to the case 9, one end of the belt 53 being pulled forward causes the pulley 51 to be pushed forward while rotating, with respect to the case 9, along with the movement of the belt 53 (in the direction of arrow K in the figure). Thus, the connector body 11 is pushed forward (in the direction of arrow E in the figure).

Note that in this case, the distance of movement of the connector body 11 becomes ½ of the distance of movement of the grasping member 3. Further, because the connector body 11 is pushed back inside the case 9 when the connector is disconnected, the pulley 51 is pushed backward. Thus, the grasping member 3 is moved back to a position that is further back from the belt 53. Note that the movements of other lock pins etc. are similar to those of power supply connector 1.

According to the power supply connector 50, similar effects as those of power supply connector 1 may be obtained. That is, connection with the power reception connector can easily be performed without strong force.

Although embodiments of the present invention have been described in detail above with reference to the accompanying figures, the present invention is not limited to such embodiments. It should be obvious to those in the field that examples of various changes and modifications are included within the realm of the technical idea of the present invention, and it should be understood that such examples are included in the technical scope of the present invention.

For example, the shape of the grasping member 3 and the arrangement and shape of each composition of the members within the case 9 are not limited to those exemplified in the figures.

DESCRIPTION OF NOTATIONS 1, 40, 50 power supply connector
3 grasping member
5 handle
7 operation part
7a lock pin
9 case
11 connector body
13 arm
15a, 15b linkage
17 locking member
17a lock pin
17b joint
19 concaved part
21 joint
23a, 23b, 23c pin
25 display part
27a mark
29a, 29b link
31a, 31b pin
33 power reception connector
35 concaved part
37 connector body
41a, 41b coupling member
43a, 43b gear
51 pulley
53 belt
55 spring
100 power supply connector
101 connector body
103 handle

The invention claimed is:
1. A power supply connector for electric automobiles, comprising:
 a connector body;
 a case for accommodating the connector body;
 a grasping member that is attached to the case and includes a handle, at least part of the handle being arranged on a line extending from the central axis of the connector body; and
 a locking portion for maintaining connection with a power reception-side connector; wherein the connector body and the grasping member are slidable in a direction of nearly the same axis line with respect to the case, by moving the grasping member forward with respect to the case, the connector body is movable toward a forward position with respect to the case, along with the movement of the grasping member, and the grasping member includes a release mechanism for releasing the locking portion.

2. The power supply connector according to claim 1, wherein the release mechanism comprises a display part that enables distinguishing and visually recognizing a locked state and a released state of the power supply connector.

3. The power supply connector according to claim 1, wherein the grasping member comprises a deceleration mechanism and the movement of the grasping member and the connector body with respect to the case is performed via the deceleration mechanism; and when moving the grasping member with respect to the case, the distance of movement of the connector body with respect to the case is smaller than the distance of movement of the grasping member with respect to the case.

4. The power supply connector according to claim 3, wherein the case comprises an arm member; and in the deceleration mechanism, an end vicinity of the arm member is rotatably provided on the case, the other end vicinity of the arm member is rotatably connected to the grasping member, and the connector body is rotatably connected to a part of the arm member between the connection part with the case and the connection part with the grasping member; and when the grasping member is moved with respect to the case, the arm member rotates with the connection part with the case serving as its center, and the connector body moves with respect to the case along with the rotation of the arm member.

5. The power supply connector according to claim 3, wherein the case comprises a first gear and a second gear with less numbers of teeth than the first gear; and in the deceleration mechanism, the first gear and second gear are rotatably provided on the case;

the grasping member is connected to the first gear via a first coupling member, and a linear-direction movement of the grasping member is converted to a rotational-direction movement of the first gear;

the connector body is connected to the second gear via a second coupling member, and the rotational-direction movement of the second gear is converted to the linear-direction movement of the connector body; and when the grasping member is moved with respect to the case, the first gear rotates, the rotation is transmitted to the second gear, and the connector body moves with respect to the case along with the rotation of the second gear.

6. The power supply connector according to claim 3, wherein the connector body comprises a pulley; and in the deceleration mechanism, one end of a belt hung on the pulley is fixed to the case;

the other end of the belt is connected to the grasping member; and when the grasping member is moved with respect to the case, the pulley is moved with respect to the case via the belt, and the connector body moves with respect to the case.

7. The power supply connector according to claim 1, wherein the grasping member is slidable with respect to the case via a parallel link.

* * * * *